United States Patent
Santi et al.

(10) Patent No.: US 9,234,612 B2
(45) Date of Patent: *Jan. 12, 2016

(54) THREADED JOINT WITH ENERGIZABLE SEAL

(75) Inventors: Nestor J. Santi, Buenos Aires (AR); Gastón Mazzaferro, Buenos Aires (AR); Alfredo Quiroga, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 878 days.

This patent is subject to a terminal disclaimer.

(21) Appl. No.: 12/665,921

(22) PCT Filed: Jun. 20, 2008

(86) PCT No.: PCT/EP2008/057861
§ 371 (c)(1),
(2), (4) Date: Dec. 21, 2009

(87) PCT Pub. No.: WO2009/000766
PCT Pub. Date: Dec. 31, 2008

(65) Prior Publication Data
US 2010/0181727 A1    Jul. 22, 2010

(30) Foreign Application Priority Data

Jun. 22, 2007   (EP) .................... 07110867

(51) Int. Cl.
*F16J 15/02*    (2006.01)
*E21B 33/00*    (2006.01)
(Continued)

(52) U.S. Cl.
CPC ............ *F16L 15/003* (2013.01); *F16L 15/008* (2013.01); *F16L 17/02* (2013.01);
(Continued)

(58) Field of Classification Search
CPC ....... F16J 15/022; F16J 15/025; F16J 15/121;
F16J 15/0887; F16J 15/104; F16J 15/127;
E21B 2033/005; F16L 15/003; F16L 15/008;
F16L 17/02; F16L 17/025; F16L 17/03;
F16L 17/035
USPC .................. 277/611, 607, 616, 625
See application file for complete search history.

(56) References Cited

U.S. PATENT DOCUMENTS

| 1,590,357 A | 6/1926 | Feisthamel |
| 1,671,458 A | 5/1928 | Wilson |

(Continued)

FOREIGN PATENT DOCUMENTS

| AT | 388791 B | 8/1989 |
| CA | 2319926 | 7/2008 |

(Continued)

OTHER PUBLICATIONS

International Search Report as mailed on Oct. 31, 2008 in PCT Application No. PCT/EP2008/057861.

(Continued)

*Primary Examiner* — Kristina Fulton
*Assistant Examiner* — Nicholas L Foster
(74) *Attorney, Agent, or Firm* — Knobbe, Martens, Olson & Bear, LLP (57) ABSTRACT

A threaded joint has a sealing ring radially positioned between a pin and a box and axially positioned on a portion of the pin on an opposite side of the threads of the pin from the nose of the pin. The sealing ring has two protruding annular lips positioned at a skewed angle to the longitudinal axis, two or more radial annular ribs on an external surface, an internal surface, and an at least partly embedded reinforcement ring. When the joint is made up, the sealing ring is in sealing contact with an annular groove of the box by the annular ribs and in sealing contact with the pin by the internal surface. The internal surface of the sealing ring can have a uniform diameter or have radially protruding annular ribs.

36 Claims, 5 Drawing Sheets (51) Int. Cl.
  *F16J 15/12*     (2006.01)
  *F16J 15/08*     (2006.01)
  *F16L 15/00*     (2006.01)
  *F16L 17/035*    (2006.01)
  *F16L 17/025*    (2006.01)
  *F16L 17/02*     (2006.01)

(52) U.S. Cl.
  CPC ......... *E21B 2033/005* (2013.01); *F16J 15/025* (2013.01); *F16J 15/0887* (2013.01); *F16J 15/121* (2013.01); *F16J 15/127* (2013.01); *F16L 17/025* (2013.01); *F16L 17/035* (2013.01)

(56) References Cited

U.S. PATENT DOCUMENTS

| | | | | |
|---|---|---|---|---|
| 1,799,762 | A | 1/1929 | Rathbun | |
| 1,999,706 | A | 4/1935 | Spang | |
| 2,075,427 | A | 3/1937 | Church | |
| 2,211,173 | A | 8/1940 | Shaffer | |
| 2,487,241 | A | 11/1949 | Hilton | |
| 2,539,057 | A | 1/1951 | Brown | |
| 2,567,113 | A | 9/1951 | Kristensen | |
| 2,631,871 | A | 3/1953 | Stone | |
| 2,766,998 | A * | 10/1956 | Watts et al. | 285/334.2 |
| 2,841,429 | A * | 7/1958 | McCuistion | 277/402 |
| 2,916,306 | A * | 12/1959 | Rickard | 285/5 |
| 2,992,021 | A | 7/1961 | Nay | |
| 2,992,613 | A | 7/1961 | Bodine | |
| 3,016,250 | A | 1/1962 | Franck | |
| 3,041,088 | A | 6/1962 | Brandon | |
| 3,054,628 | A | 9/1962 | Hardy et al. | |
| 3,150,889 | A | 9/1964 | Watts | |
| 3,219,354 | A | 11/1965 | Kazienko | |
| 3,266,824 | A | 8/1966 | Nealy | |
| 3,307,860 | A | 3/1967 | Blount et al. | |
| 3,325,174 | A | 6/1967 | Weaver | |
| 3,362,731 | A | 1/1968 | Gasche et al. | |
| 3,489,437 | A | 1/1970 | Duret | |
| 3,512,789 | A * | 5/1970 | Tanner | 277/647 |
| 3,552,781 | A | 1/1971 | Helland | |
| 3,572,777 | A | 3/1971 | Blose et al. | |
| 3,575,430 | A | 4/1971 | Alpine | |
| 3,592,491 | A | 7/1971 | Glover | |
| 3,599,931 | A * | 8/1971 | Hanson | 251/144 |
| 3,733,093 | A | 5/1973 | Seiler | |
| 3,810,793 | A | 5/1974 | Heller | |
| 3,854,760 | A | 12/1974 | Duret | |
| 3,889,989 | A | 6/1975 | Legris et al. | |
| 3,893,919 | A * | 7/1975 | Flegel et al. | 210/166 |
| 3,918,726 | A * | 11/1975 | Kramer | 277/651 |
| 3,986,731 | A | 10/1976 | DeHoff | |
| 4,014,568 | A | 3/1977 | Carter et al. | |
| 4,147,368 | A * | 4/1979 | Baker et al. | 277/625 |
| 4,219,204 | A * | 8/1980 | Pippert | 277/584 |
| 4,299,412 | A | 11/1981 | Parmann | |
| 4,310,163 | A * | 1/1982 | Pippert | 277/562 |
| 4,345,739 | A * | 8/1982 | Wheatley | 251/358 |
| 4,366,971 | A | 1/1983 | Lula | |
| 4,368,894 | A | 1/1983 | Parmann | |
| 4,373,750 | A | 2/1983 | Mantelle et al. | |
| 4,384,737 | A | 5/1983 | Reusser | |
| 4,406,561 | A | 9/1983 | Ewing | |
| 4,473,471 | A * | 9/1984 | Robichaud et al. | 210/443 |
| 4,475,839 | A | 10/1984 | Strandberg | |
| 4,570,982 | A | 2/1986 | Blose et al. | |
| 4,591,195 | A | 5/1986 | Chelette et al. | |
| 4,592,558 | A * | 6/1986 | Hopkins | 277/572 |
| 4,601,491 | A | 7/1986 | Bell, Jr. et al. | |
| 4,602,807 | A | 7/1986 | Bowers | |
| 4,623,173 | A | 11/1986 | Handa et al. | |
| 4,662,659 | A | 5/1987 | Blose et al. | |
| 4,674,756 | A * | 6/1987 | Fallon et al. | 277/624 |
| 4,688,832 | A | 8/1987 | Ortloff et al. | |
| 4,706,997 | A | 11/1987 | Carstensen | |
| 4,762,344 | A | 8/1988 | Perkins et al. | |
| 4,844,517 | A | 7/1989 | Beiley et al. | |
| 4,856,828 | A | 8/1989 | Kessler et al. | |
| 4,955,645 | A | 9/1990 | Weems | |
| 4,958,862 | A | 9/1990 | Cappelli et al. | |
| 4,988,127 | A | 1/1991 | Cartensen | |
| 5,007,665 | A | 4/1991 | Bovisio et al. | |
| 5,067,874 | A | 11/1991 | Foote | |
| 5,137,310 | A | 8/1992 | Noel et al. | |
| 5,180,008 | A | 1/1993 | Aldridge et al. | |
| 5,242,199 | A | 9/1993 | Hann et al. | |
| 5,348,350 | A | 9/1994 | Blose et al. | |
| 5,505,502 | A | 4/1996 | Smith et al. | |
| 5,515,707 | A | 5/1996 | Smith | |
| 5,653,452 | A | 8/1997 | Järvenkylä | |
| 5,712,706 | A | 1/1998 | Castore et al. | |
| 5,794,985 | A | 8/1998 | Mallis | |
| 5,810,401 | A | 9/1998 | Mosing et al. | |
| 5,860,680 | A * | 1/1999 | Drijver et al. | 285/95 |
| 5,879,030 | A | 3/1999 | Clayson et al. | |
| 6,044,539 | A * | 4/2000 | Guzowski | 29/453 |
| 6,045,165 | A | 4/2000 | Sugino et al. | |
| 6,056,324 | A | 5/2000 | Reimert et al. | |
| 6,070,912 | A | 6/2000 | Latham | |
| 6,173,968 | B1 | 1/2001 | Nelson et al. | |
| 6,347,814 | B1 | 2/2002 | Cerruti | |
| 6,349,979 | B1 | 2/2002 | Noel et al. | |
| 6,412,831 | B1 | 7/2002 | Noel et al. | |
| 6,447,025 | B1 | 9/2002 | Smith | |
| 6,478,344 | B2 | 11/2002 | Pallini, Jr. et al. | |
| 6,481,760 | B1 | 11/2002 | Noel et al. | |
| 6,494,499 | B1 | 12/2002 | Galle, Sr. et al. | |
| 6,550,822 | B2 * | 4/2003 | Mannella et al. | 285/333 |
| 6,557,906 | B1 | 5/2003 | Carcagno | |
| 6,581,940 | B2 * | 6/2003 | Dittel | 277/606 |
| 6,752,436 | B1 | 6/2004 | Verdillon | |
| 6,755,447 | B2 | 6/2004 | Galle, Jr. et al. | |
| 6,764,108 | B2 | 7/2004 | Ernst et al. | |
| 6,814,358 | B2 * | 11/2004 | Keck | 277/638 |
| 6,851,727 | B2 | 2/2005 | Carcagno et al. | |
| 6,857,668 | B2 | 2/2005 | Otten et al. | |
| 6,883,804 | B2 * | 4/2005 | Cobb | 277/549 |
| 6,905,150 | B2 | 6/2005 | Carcagno et al. | |
| 6,921,110 | B2 | 7/2005 | Morotti et al. | |
| 6,971,681 | B2 | 12/2005 | Dell'Erba et al. | |
| 6,991,267 | B2 | 1/2006 | Ernst et al. | |
| 7,014,223 | B2 | 3/2006 | Pina et al. | |
| 7,066,499 | B2 | 6/2006 | Pina et al. | |
| 7,108,063 | B2 | 9/2006 | Carstensen | |
| 7,255,374 | B2 | 8/2007 | Carcagno et al. | |
| 7,284,770 | B2 | 10/2007 | Dell'erba et al. | |
| 7,310,867 | B2 * | 12/2007 | Corbett, Jr. | 29/451 |
| 7,431,347 | B2 | 10/2008 | Ernst et al. | |
| 7,464,449 | B2 | 12/2008 | Santi et al. | |
| 7,475,476 | B2 | 1/2009 | Roussie | |
| 7,478,842 | B2 | 1/2009 | Reynolds, Jr. et al. | |
| 7,506,900 | B2 | 3/2009 | Carcagno et al. | |
| 7,621,034 | B2 | 11/2009 | Roussie | |
| 7,735,879 | B2 | 6/2010 | Toscano et al. | |
| 7,753,416 | B2 | 7/2010 | Mazzaferro et al. | |
| 8,215,680 | B2 | 7/2012 | Santi | |
| 8,262,094 | B2 * | 9/2012 | Beele | 277/607 |
| 8,262,140 | B2 | 9/2012 | Santi et al. | |
| 8,333,409 | B2 | 12/2012 | Santi et al. | |
| 8,544,304 | B2 | 10/2013 | Santi | |
| 8,636,856 | B2 | 1/2014 | Altschuler et al. | |
| 8,840,152 | B2 | 9/2014 | Carcagno et al. | |
| 9,004,544 | B2 | 4/2015 | Carcagno et al. | |
| 2002/0153671 | A1 | 10/2002 | Raymond et al. | |
| 2003/0168859 | A1 | 9/2003 | Watts | |
| 2004/0118490 | A1 | 6/2004 | Klueh et al. | |
| 2004/0118569 | A1 | 6/2004 | Brill et al. | |
| 2004/0195835 | A1 | 10/2004 | Noel et al. | |
| 2004/0262919 | A1 | 12/2004 | Dutilleul et al. | |
| 2005/0012278 | A1 * | 1/2005 | DeLange | 277/602 |
| 2005/0093250 | A1 | 5/2005 | Santi et al. | |
| 2005/0166986 | A1 | 8/2005 | Dell'erba et al. | |
| 2006/0006600 | A1 | 1/2006 | Roussie | |
| 2006/0273586 | A1 | 12/2006 | Reynolds, Jr. et al. | |

(56) References Cited

U.S. PATENT DOCUMENTS

| | | |
|---|---|---|
| 2007/0039147 A1 | 2/2007 | Shimanouchi et al. |
| 2007/0246219 A1* | 10/2007 | Mannella et al. ............ 166/344 |
| 2008/0264129 A1 | 10/2008 | Cheppe et al. |
| 2008/0303274 A1 | 12/2008 | Mazzaferro et al. |
| 2010/0181761 A1 | 7/2010 | Santi et al. |
| 2010/0187808 A1 | 7/2010 | Santi |
| 2011/0008101 A1 | 1/2011 | Santi et al. |
| 2011/0041581 A1 | 2/2011 | Santi |
| 2011/0042946 A1 | 2/2011 | Santi |
| 2011/0097235 A1 | 4/2011 | Turconi et al. |
| 2011/0133449 A1 | 6/2011 | Mazzaferro |
| 2011/0233925 A1 | 9/2011 | Pina |
| 2011/0233926 A1 | 9/2011 | Carcagno |
| 2012/0032435 A1 | 2/2012 | Carcagno |

FOREIGN PATENT DOCUMENTS

| | | |
|---|---|---|
| DE | 3310226 A1 | 10/1984 |
| EP | 0 032 265 | 7/1981 |
| EP | 0 104 720 | 4/1984 |
| EP | 0 159 385 | 10/1985 |
| EP | 0 309 179 | 3/1989 |
| EP | 0 340 385 | 11/1989 |
| EP | 0 989 196 | 3/2000 |
| EP | 1 065 423 | 1/2001 |
| EP | 1 277 848 | 1/2003 |
| EP | 1 296 088 | 3/2003 |
| EP | 1 362977 | 11/2003 |
| EP | 1 705 415 | 9/2006 |
| EP | 1 726 861 | 11/2006 |
| EP | 2 000 629 A1 | 12/2008 |
| EP | 1554518 B1 | 1/2009 |
| FR | 1 149 513 A | 12/1957 |
| FR | 2 704 042 A | 10/1994 |
| FR | 2 848 282 A1 | 6/2004 |
| GB | 1 398 214 | 6/1973 |
| GB | 1 428 433 | 3/1976 |
| GB | 2 276 647 | 10/1994 |
| GB | 2 388 169 A | 11/2003 |
| JP | 58-187684 | 12/1983 |
| JP | 07-139666 | 5/1995 |
| WO | WO 84/02947 | 8/1984 |
| WO | WO 94/29627 | 12/1994 |
| WO | WO 96/22396 | 7/1996 |
| WO | WO 00/06931 | 2/2000 |
| WO | WO 01/75345 | 10/2001 |
| WO | WO 02/29290 | 4/2002 |
| WO | WO 02/35128 | 5/2002 |
| WO | WO 02/068854 | 9/2002 |
| WO | WO 02/086369 A | 10/2002 |
| WO | WO 02/093045 | 11/2002 |
| WO | WO 03/087646 | 10/2003 |
| WO | WO 2004/033951 | 4/2004 |
| WO | WO 2004/053376 A | 6/2004 |
| WO | WO 2006/087361 | 4/2006 |
| WO | WO 2007/002576 | 1/2007 |
| WO | WO 2007/017082 | 2/2007 |
| WO | WO 2007/017161 | 2/2007 |
| WO | WO 2007/028443 | 3/2007 |
| WO | WO 2007/063079 | 6/2007 |
| WO | WO 2008/090411 | 7/2008 |
| WO | WO 2009/000851 | 12/2008 |
| WO | WO 2009/000766 | 1/2009 |
| WO | WO 2009/010507 | 1/2009 |
| WO | WO 2009/027308 | 3/2009 |
| WO | WO 2009/027309 | 3/2009 |
| WO | WO 2009/106623 | 9/2009 |
| WO | WO 2010/122431 | 10/2010 |

OTHER PUBLICATIONS

The ongoing prosecution history of U.S. Appl. No. 13/264,731, filed Oct. 14, 2011, including without limitation Office Actions, Amendments, Remarks, and any other potentially relevant documents.
U.S. Appl. No. 11/546,974, filed Nov. 5, 2003 and its ongoing prosecution history, inclduing without limitation Office Actions, Amendments, Remarks, and any other potentially relevant documents.
U.S. Appl. No. 12/669,177, filed Jan. 14, 2010 and its ongoing prosecution history, including without limitation Office Actions, Amendments, Remarks, and any other potentially relevant documents.
U.S. Appl. No. 12/665,902, filed Dec. 21, 2009 and its ongoing prosecution history, including without limitation Office Actions, Amendments, Remarks, and any other potentially relevant documents.
U.S. Appl. No. 12/920,085, filed Aug. 27, 2010 and its ongoing prosecution history, including without limitation Office Actions, Amendments, Remarks, and any other potentially relevant documents.
U.S. Appl. No. 12/674,800, filed Feb. 23, 2010 and its ongoing prosecution history, including without limitation Office Actions, Amendments, Remarks, and any other potentially relevant documents.
U.S. Appl. No. 12/673,833, filed Feb. 17, 2010 and its ongoing prosecution history, including without limitation Office Actions, Amendements, Remarks, and any other potentially relevant documents.
U.S. Appl. No. 12/954,588, filed Nov. 24, 2010 and its ongoing prosecution history, including without limitation Office Actions, Amendments, Remarks, and any other potentially relevent documents.
U.S. Appl. No. 13/072,533, filed Mar. 25, 2011 and its ongoing prosecution history, including without limitation Office Actions, Amendments, Remarks, and any other potentially relevant documents.
U.S. Appl. No. 13/073,917, filed Mar. 28, 2011 and its ongoing prosecution history, including without limitation Office Actions, Amendments, Remarks, and any other potentially relevant documents.
American Petroleum Institute, Specification 5B, Apr. 2008, 15th Edition (Excerpts Only).
Chang, L.C., "Microstructures and reaction kinetics of bainite transformation in Si-rich steels," XP0024874, Materials Science and Engineering, vol. 368, No. 1-2, Mar. 15, 2004, pp. 175-182, Abstract, Table 1.
International Preliminary Report on Patentability dated Dec. 22, 2009 from PCT Application No. PCT/EP2008/057861.
International Written Opinion dated Oct. 31, 2008 from PCT Application No. PCT/EP2008/057861.

* cited by examiner

THREADED JOINT WITH ENERGIZABLE SEAL

CROSS-REFERENCE TO RELATED APPLICATIONS

This application is a U.S. National Phase of PCT International Application No. PCT/EP2008/057861, filed Jun. 20, 2008 and published as WO 2009/000766 on Dec. 31, 2008, which claims priority to European Application No. 07110867.4, filed Jun. 22, 2007. The disclosure of both prior applications is incorporated by reference in their entirety and should be considered a part of this specification.

FIELD OF THE INVENTION

The present invention relates to threaded joints, in particular for connecting tubes of predefined length to create strings used in the hydrocarbon industry especially for use in the field of OCTG (Oil Country Tubular Goods) and pipelines in offshore applications.

BACKGROUND OF THE INVENTION

Searching for oil or more generally hydrocarbons has become more demanding in terms of hardware and devices in recent years because oil and gas fields or reservoirs are located deeper or in places difficult to reach and below the sea floor. Prospecting for and exploitation of hydrocarbon fields make it necessary to use hardware which is more resistant to environmental challenges such as higher loads and corrosion, which were less important in the past.

Modern joints are generally designed with metal to metal seals made by the contact between two surfaces, usually at one end or at both ends of the threaded portion of the joint, interfering in the elastic range of the modulus of elasticity for an appropriate stress magnitude. However in specific situations, resilient seals are needed instead of or in combination with metallic seals, to prevent penetration of external fluids in the interstices of the threads.

It is therefore a design requirement that the joint seals resist penetration of external or internal fluids, or at least do not allow continuous exchange of fluids that have already penetrated the joint with the surrounding fluids, in order to reduce the corrosion rate.

To solve the mentioned problems various solutions have been provided, one of which consists of inserting a seal ring made of plastic material, e.g. an O-ring, at the extremity of the joint external to the threaded portion.

It is a widespread practice to use O-rings pre-mounted onto the box, but this practice has two disadvantages: the seal rings can be damaged during mounting of the ring and/or during make-up, and O-rings of simple cross-section cannot offer redundant sealing functions.

Seal rings with more sophisticated shapes have also been proposed to increase efficiency and prevent external fluids from penetrating into the gaps of the joint. However such seal rings are subject to large stresses and adverse environmental conditions, both during the initial make-up operation and during operational life, such that their efficiency is much reduced after some time.

Another drawback of such elastic seal rings is the damage caused during the make-up operation because operators in the field can cause shocks between the tubes. The seal ring can thus be torn or suffer permanent deformation which later can jeopardize the sealing efficiency during operational life.

Document WO2004053376 discloses a threaded connection for connecting pipes for hydrocarbon wells with tapered male and female threads; an annular housing is provided in the vicinity of the free end of the female element, which housing receives a portion of a deformable sealing ring, which is radially compressed, while a retaining lip of the ring is immobilized in a further annular housing of the female element by a rib on the male element. However such a lip is a weak and fragile element due to its small cross-section, and its shape requires that the sealing ring be manufactured with a material having high slidability. It may easily break leaving the seal ring unretained and free to move axially. Moreover the seal ring is made of a material with low friction coefficient, reducing the available materials that can be used.

Such a seal ring can be considered as a seal having multiple sealing mechanisms working as a whole. Another disadvantage of this solution is that there is a need to machine customized annular ribs and/or grooves on the pin and box to position the seal ring which entails expensive and lengthy operations. Making the ribs and/or grooves requires high precision machining to provide the correct relative axial position of the rib or groove with respect to the nose of the box after make up. Moreover the seal ring is prone to twisting during make up, which makes operation difficult.

SUMMARY OF THE INVENTION

It is therefore a main object of the present invention to provide a threaded joint which overcomes the aforementioned drawbacks containing an innovative seal ring ensuring both a simple and secure initial make-up operation and a high sealing efficiency during operation.

The above mentioned objects are achieved in accordance with the present invention by means of a threaded joint defining an axis comprising a male threaded tube, defined as the pin, and a female threaded tube, defined as the box, and a sealing ring, the pin being adapted to be made up in the box, the sealing ring having a first base, a second face axially opposite to the first base, at least two protruding annular lips placed at an angle to the axis on the second face, an external cylindrical surface with at least two annular ribs, a reinforcement ring embedded at least partly in the sealing ring, the sealing ring being interposed between the pin and the box, placed on a portion of the surface of the pin after the end of the threaded section of the pin, in tight sealing contact with an internal surface of an annular groove of the box by the annular ribs and in tight sealing contact with an external surface of the pin by an internal surface.

The innovative combination of features of the invention that contribute to the improvements of the threaded joint are thus the V-sectioned mouth that ensures a better contact of the ring end with the surfaces of the pin and box when pressure from an external fluid is exerted on that end. The external protruding ribs ensure a better specific pressure on the surfaces of the pin and box to which they adhere. The sealing inner surface ensures a good positioning and contact in the ring housing made on the pin external surface. Advantageously the provision of a reinforcement ring ensures that the seal ring holds tight on the pin.

The seal ring of the invention is advantageously pre-mounted onto the pin, thus avoiding damage of the seal ring during make-up. The seal ring also has additional overlapped or redundant sealing functions, which secure tightness to the whole joint, even when one of the functions is singularly overcome by the external fluid. After completion of make up, the seal ring is retained in an annular housing by the inner surface of the box and the outer surface of the pin which can also be provided with a finishing and a coating layer. The housing has a geometry especially designed to cooperate together with the seal. The coating also protects the machined surface of both pin and box.

The joint of the invention does not require additional machining apart from the common threading operations. The provision of a reinforcement ring, preferably embedded in the sealing ring, prevents twisting of the ring, makes the make up operation easier, and in general assures easier handling and make up of the seal ring itself.

By virtue of the protruding ribs present on the external surface of the sealing ring in the presence of a wrapping force equal to that commonly used for state of the art rings, there is produced a concentration of the stresses and higher localized contact pressures caused by the compression of the sealing ring between the pin and box, which enhances sealability of the joint.

The provision of a coating on the seal ring contact surfaces ensures the necessary slidability for the housing, the seal ring being able to easily wrap, squeeze or move.

BRIEF DESCRIPTION OF THE DRAWINGS

The foregoing and other objects will become more readily apparent by referring to the following detailed description and the appended drawings in which:

FIGS. 4a, b, c show embodiments of a component of the joint in accordance with the present invention.

DETAILED DESCRIPTION

With particular reference to the figures, there is shown a threaded joint indicated globally with reference numeral 1, connecting two tubes, a male tube, or pin 3, with an external nominal diameter D, and a female tube or box 2 of external diameter D1.

The pin 3 has a threaded portion 5 with male threads of appropriate profile, e.g. trapezoidal, and the box 2 has an internal threaded portion 4 with corresponding female threads.

The common axis of the joint 1, pin 3 and box 2 is indicated with A.

The portion of the box 2 close to its nose 6 comprises a non-threaded surface 7.

Advantageously but not necessarily, a housing in the shape of an annular groove 10 is made on the internal surface of the box 2 between the end of the thread 4 and the nose 6. This housing houses a sealing ring 11. In this embodiment shown in FIG. 1, the housing 10 made in the internal surface of box 2 has preferably a cylindrical surface.

The sealing ring 11 has a main body on which there are externally one or more annular ribs 18 separated by annular grooves 17. At the extremity which is closer to the threaded portions 4, 5 the sealing ring 11 has a base 21 substantially, but not exclusively, flat.

Close to this base 21 there is provided a reinforcement ring 14, of another material which has greater stiffness, preferably, but not exclusively, metal such as aluminium, copper, silver, nickel, steel, or stainless steel. Some reinforcement rings 14 are plated or coated with cadmium, copper, nickel, silver, gold, or indium. Others are heat-treated, age-hardened or annealed.

Figure 4:
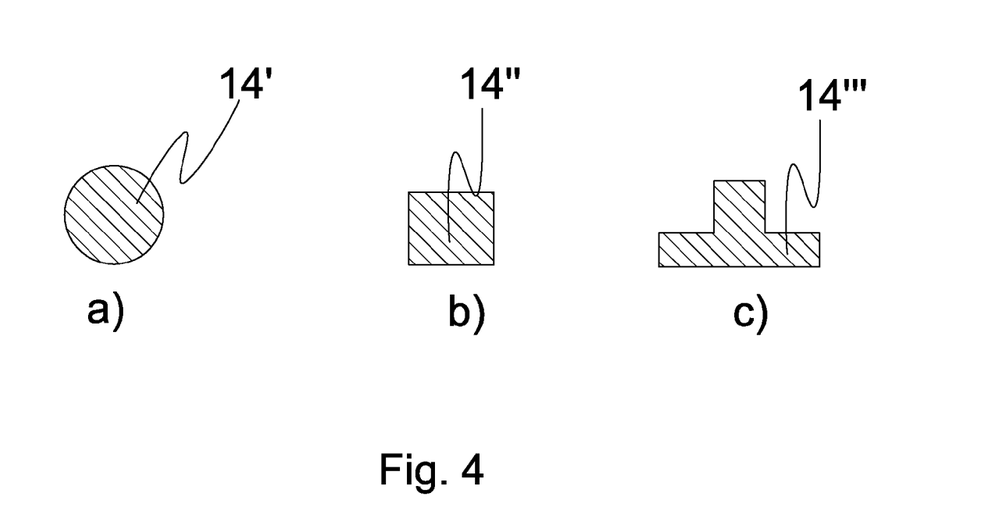

The reinforcement ring 14 can be completely embedded in the sealing ring 11 or can have one of its surfaces exposed to the exterior of the sealing ring 11, either flush to the base 21 or protruding. The reinforcement ring can advantageously have various cross-sectional shapes, e.g. circular 14', square 14", rectangular or polygonal or T-shaped 14''', as shown by way of example in FIGS. 4a, 4b, 4c. Preferably the radial thickness of the reinforcement ring 14 must always be smaller than the radial thickness of the elastomeric seal ring 11, in order to allow deformation of the elastomer, when compressed in the space between pin 3 and box 2.

At its longitudinally opposite end the sealing ring 11 has two annular lips 15, 16 which respectively protrude beyond the perimeter of the ring 11 in respective skewed directions with respect to the axis A, in unloaded position. In the space defined by the two annular lips 15 and 16 an annular groove is defined, which in axial section appears as a V-shaped mouth 12.

Figure 1:
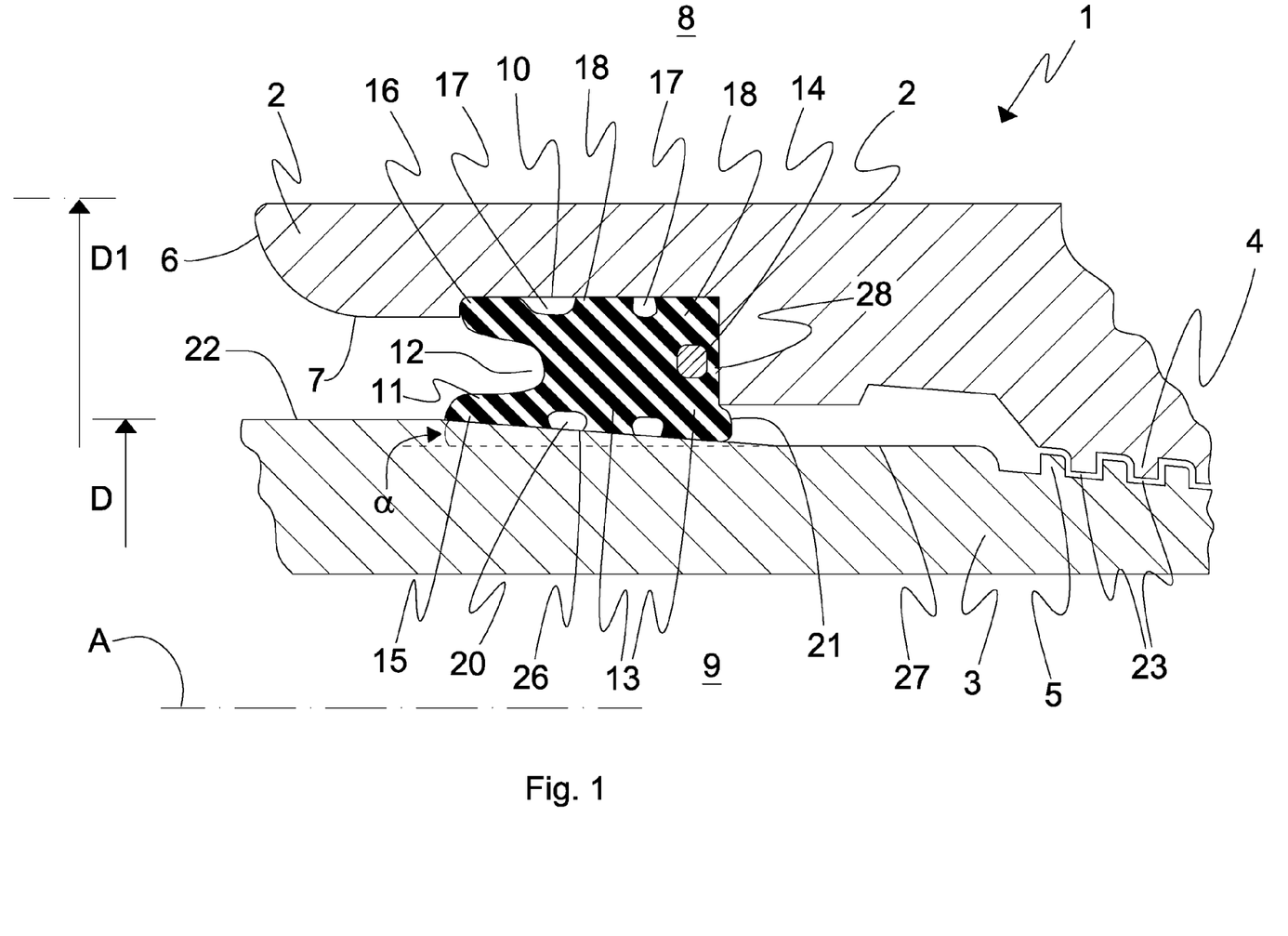
FIG. 1 shows a section view on a longitudinal axial plane of the joint in accordance with the present invention.

In a first embodiment the internal surface of the sealing ring 11 is shown in FIG. 1, where this surface is undulated in an axial direction and comprises a plurality of annular ribs 13 separated by annular grooves 20, when seen in cross-section along an axial plane.

Figure 2A:
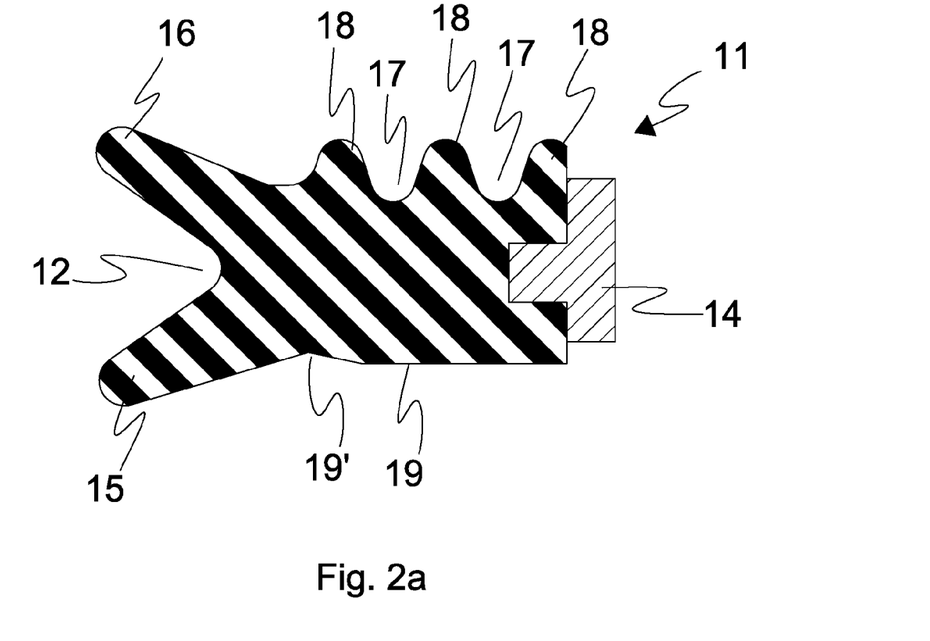
FIG. 2a shows an enlarged section view of an embodiment of a component of the joint of FIG. 1.

In another embodiment the internal surface 19 of the seal ring 11 is without abrupt variations. In this case it can have a planar cylindrical shape, as shown in FIG. 2a or alternatively a rounded, toroidal, or frusto-conical shape. In the embodiment shown in FIG. 2b, the angle of conicity β of the surface 19 with reference to the axis A is about 3°. This facilitates mounting of the seal ring 11 on the pin 3.

Figure 2B:
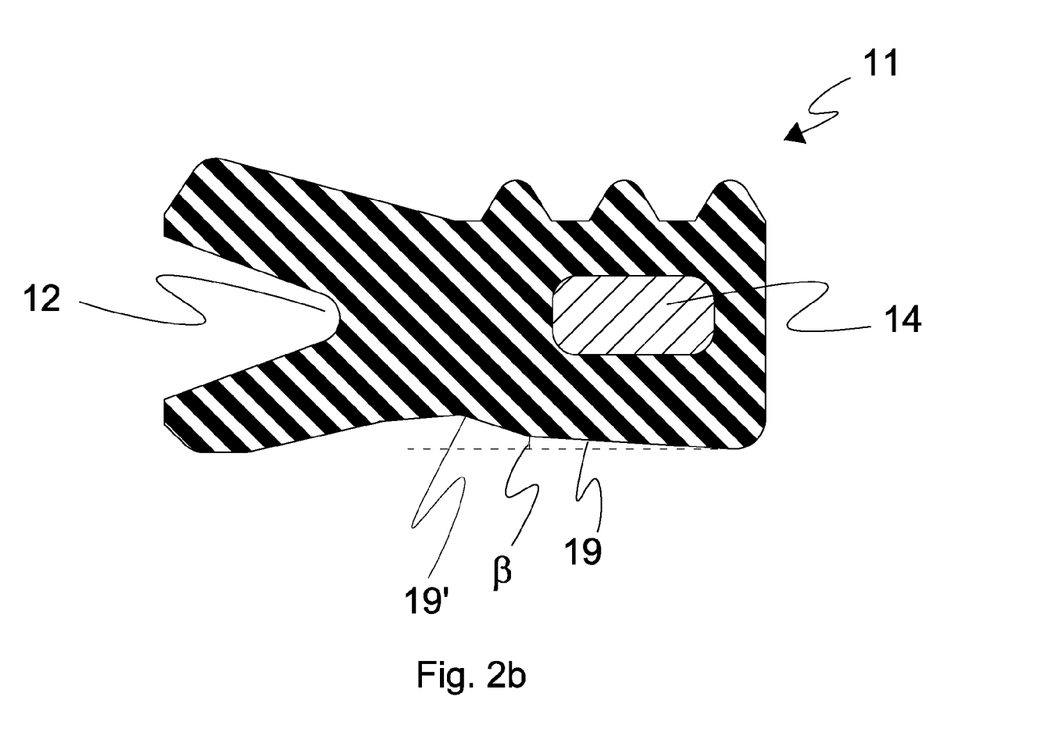
FIG. 2b shows an enlarged section view of another embodiment of a component of the joint of FIG. 1.

In the embodiments of FIGS. 2a and 2b, the internal surface 19 is separated by a groove 19' of appropriate radius from the annular lip 15.

By virtue of the reinforcement ring 14, all embodiments of the seal ring 11 exert a wrapping force, which presses the internal surface 19 of the seal ring 11 against the external surface of the pin 3, thus enhancing tightness between seal ring 11 and the external surface of the pin 3.

This wrapping stress exerted by the seal ring 11 is further enhanced by the a small taper of on the surface 26 of the pin 3 in the region designed for the seal ring 11 after make up is complete. The surface 26 of the pin 3, on which rests the sealing ring 11 in its mounted position, is inclined to the axis A by an angle α less than 15°, preferably 3°. This has the function of preventing the seal ring 11 from sliding during operation by imposing an increased gripping force. In this case, the seal ring 11 is kept in place by both frictional forces and an increasing hoop stress due to the conical pin surface 26.

Figure 1A:
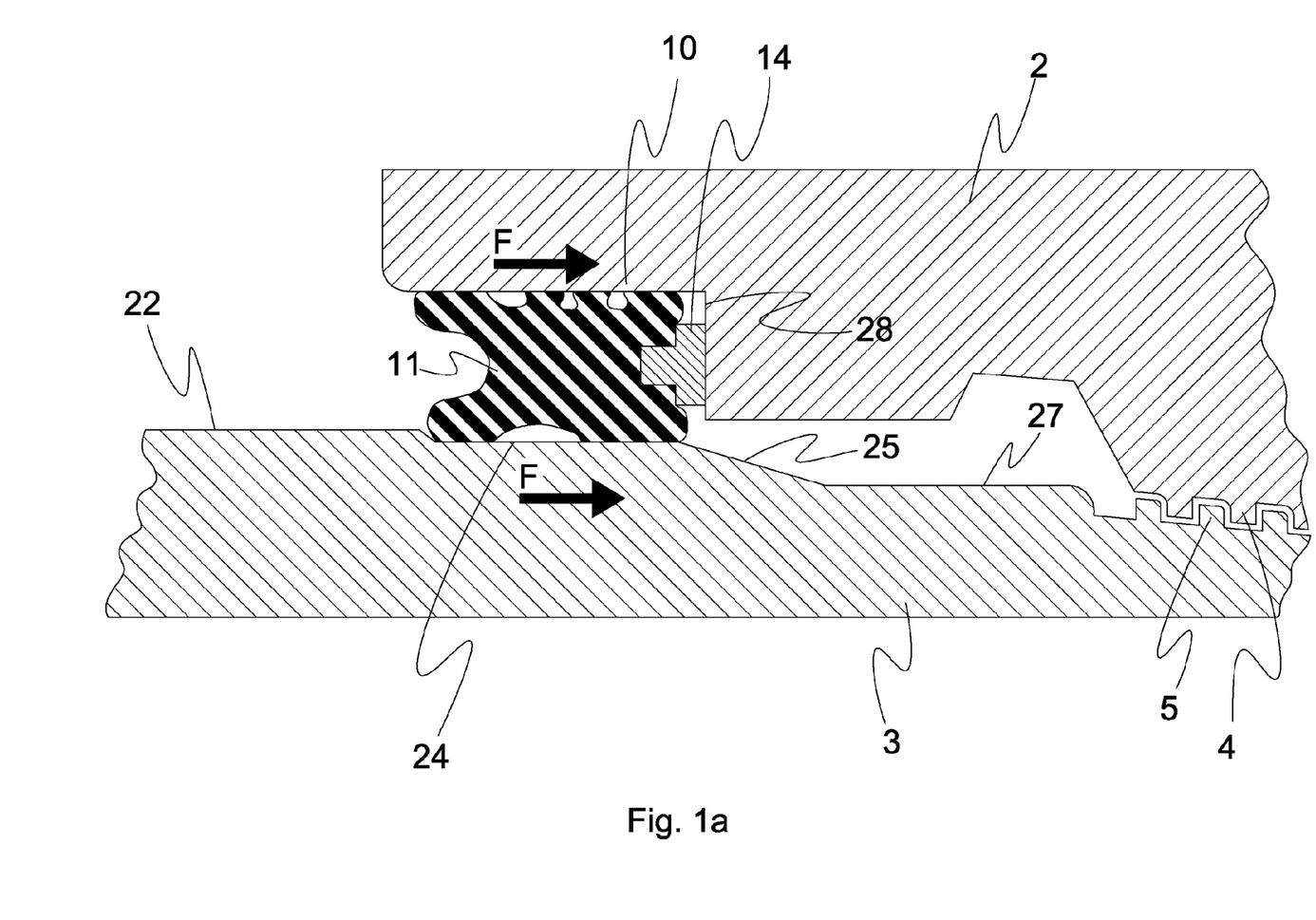
FIG. 1a shows a section view on a longitudinal axial plane of another embodiment of the joint in accordance with the present invention.
Figure 1B:
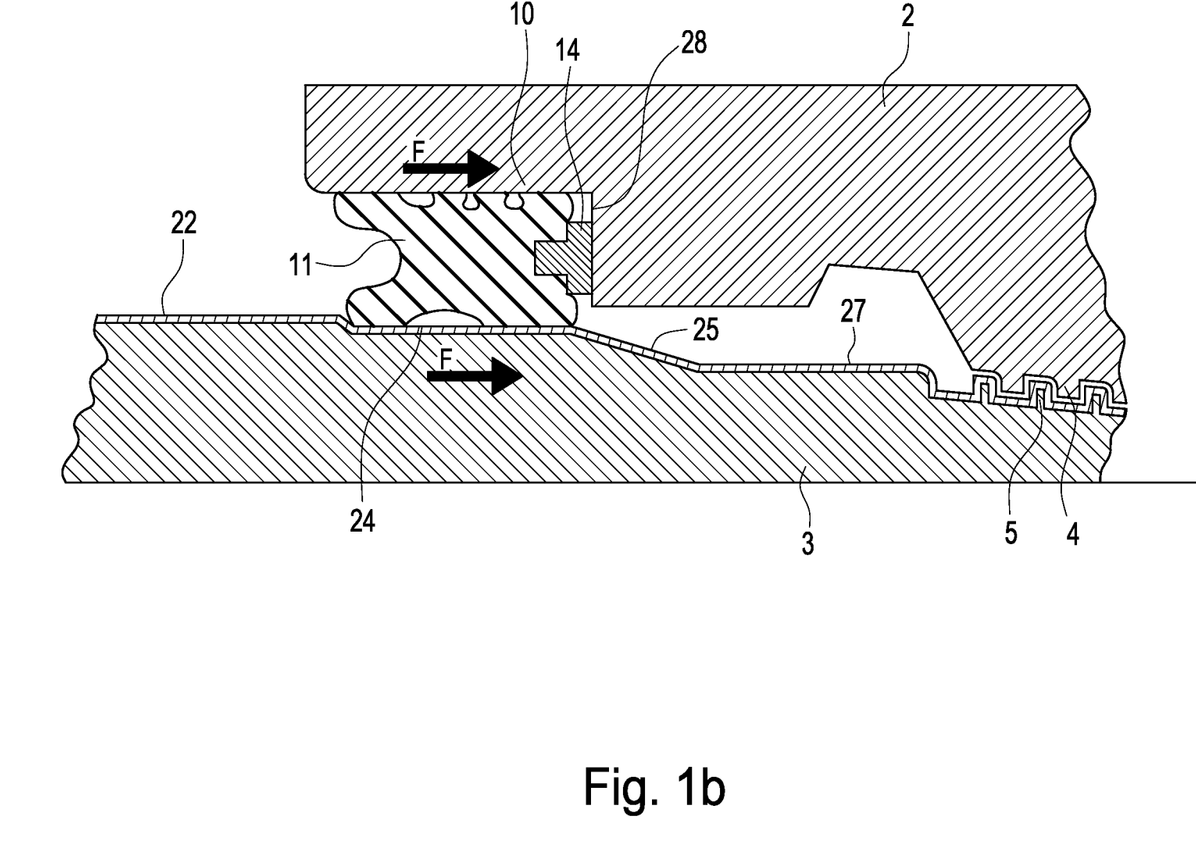
FIG. 1b shows a section view on a longitudinal axial plane of another embodiment of the joint, including a coating on the pin.

With particular reference to the embodiment of the threaded joint of FIG. 1a, alternatively the portion of surface 24 on which the sealing ring 11 rests at the completion of make up can be cylindrical. In this particular embodiment there is advantageously provided a frustoconical surface 25 to facilitate sliding of the sealing ring 11 from an initial positioning surface 27 close to the threaded portion 5 toward the final position on surface 24 along the pin 3 during make up of the box 2 on the pin 3.

In this embodiment, the pin 3 provides the frustoconical surface 25 with a conicity less than 15°, and which is positioned between two cylindrical surfaces 24 and 27. In this case, the cylindrical surface 24 is the sealing ring housing after make up and the seal ring 11 is kept in position on the surface 24 by the axial friction force produced by a constant hoop stress or wrapping force.

Figure 3:
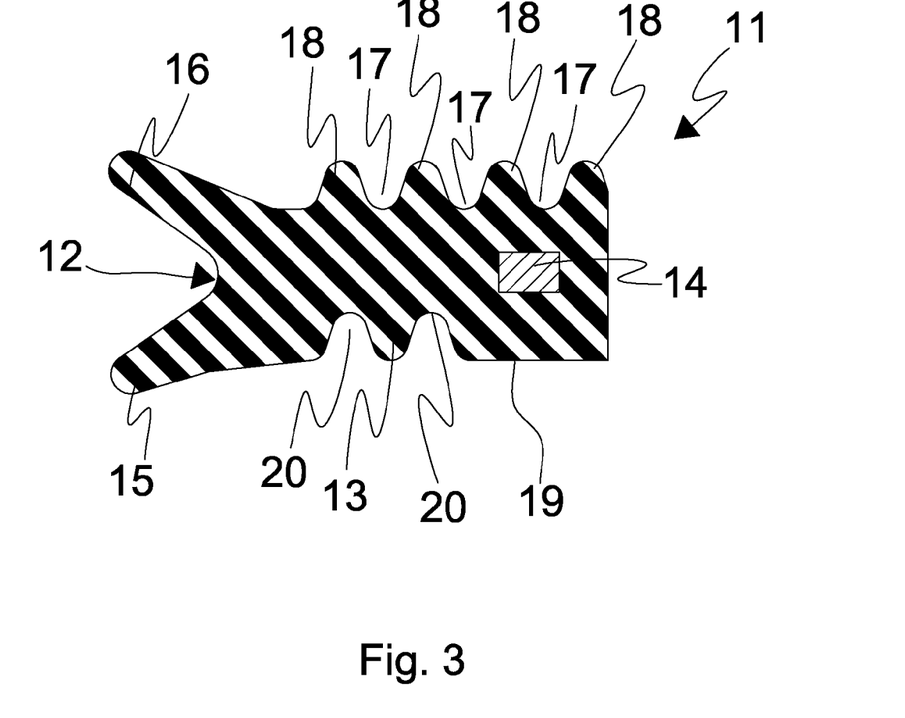
FIG. 3 shows an enlarged section view of another embodiment of a component of the joint of FIG. 1.

Advantageously, this internal surface of the sealing ring 11 can also be a combination of a portion having a cylindrical part 19 and of a portion with one or more protruding ribs 13, separated by annular grooves 20, to improve sealing effectiveness, as is shown in the embodiment of FIG. 3.

The sealing ring 11 can be made of various elastomeric materials, e.g.: Acrylonitrile-Butadiene (NBR), Carboxylated Nitrile (XNBR), Ethylene Acrylate (AEM), Ethylene Propylene Rubber (EPM, EPDM), Butyl Rubber (IIR), Butadiene Rubber (BR), Chlorobutyl Rubber (CIIR), Chloroprene Rubber (CR), Chlorosulfonated Polyethylene (CSM), Epichlorohydrin (CO, ECO), Fluorocarbon (FKM), Fluorosilicone (FVMQ), Hydrogenated Nitrile (HNBR), Perfluoroelastomer (FFKM), Polyacrylate (ACM), Polyurethane (AU, EU), Silicone Rubber (Q, MQ, VMQ, PVMQ), Styrene-Butadiene (SBR), Tetrafluoroethylene-Propylene (AFLAS®).

The joint 1 defines an inner space or duct 9, containing the axis A of the pin 3 and box 2, in which a fluid, for example a hydrocarbon such as natural gas or petroleum or other similar fluid, flows and an outer space 8 which can be in contact with fluids of various kinds, such as sea water in specific applications. The sealing ring 11 offers an additional sealing capacity to the joint 1 which prevents external fluids present outside the joint 1 from leaking into the interstices 23 of the threads of the joint 1.

The external nominal diameter D of the tubes, in the area distant from the joint 1 between the pin 3 and box 2 can be smaller than the external diameter D1 of the end portion of the box 2 in the case of a sleeve joint or can be equal in the event of an integral "flush" type joint.

As mentioned above, this seal ring 11 boasts more than one sealing function. One of the functions is performed by the annular groove 12, which expands in the radial direction under external pressure, thus constituting a self-energizable seal by reacting proportionally to such pressure and increasing adherence of the groove's internal and external lips 15, 16 to the surfaces of the pin 3 and box 2 respectively.

Yet another sealing function is performed by the external annular ribs 18 protruding radially, which behave as multiple O-rings, ensuring tightness between the seal ring 11 and the interior surface of the box 2.

The method of mounting the joint 1 with the sealing ring 11 in accordance with the invention is as follows. Prior to the make-up of the connection, this seal ring 11 is pre-mounted onto the pin 3 over the threaded portion 5 and placed on the surface 27. Having the sealing ring 11 in place avoids damage to the sealing ring 11 during make up, which is an advantage over most of the state of the art seal rings, which are pre-mounted onto the box 2 and are forced to drag across the threads 5 of the pin 3. After the sealing ring 11 is mounted on the pin 3 the standard make-up operation is performed. When make-up comes close to the end, the seal ring 11 is slightly pushed by the abutment 28 of the box 2 on the base 21 to its final position. In this last part of the make up, the seal ring 11 is pushed against the final rest surface, either 24 or 26 depending on the embodiment of the joint, thereby gradually increasing adherence of the seal ring 11 to the pin 3. On the radially opposite side, the seal ring 11 enters into the housing 10 on the box 2, if this groove is present, which ensures that the seal ring 11 does not slide in the axial direction under either internal or external pressures.

When the joint 1 has reached its final made up position, the sealing ring 11 assumes its final geometry and reaches its final design stresses and deformations. The ring 11 fulfils then the three sealing functions mentioned above and is energized to working levels. After the make up operation is completed, the ring 11 is ready to undergo further deformations under fluid pressure.

The seal ring 11 is an improved alternative to using the classic O-rings which can offer only one level of protection. It gives the threaded joint 1 several advantages:
 a capability to offer successive barriers to leaks, thanks to the multiple sealing functions provided by the seal ring 11;
 overlapped and redundant functions which maintain tightness even if one of them should fail, thanks to the combination of the self-energizable V-shaped annular groove 12, external protruding ribs 18, and the reinforcement ring 14 embedded completely or partially inside the seal ring 11.

In yet another advantageous embodiment of the invention the seal ring 11 can have an internal surface 19 that is completely cylindrical, as shown in FIG. 2, or a part of the internal surface 19 can also have internal protruding ribs 13.

The seal ring 11 is preferably used on the outside of the joint 1 between the internal surface of the box 2 and the external surface of the pin 3. Such joints may also have an internal metal-to-metal seal near the nose of the pin 3 (not shown).

Thanks to these features, the joint of the invention can nearly completely block leaks, providing full tightness.

The invention is to be used preferably in the field of OCTG and pipeline connections for the oil & gas industry, especially in offshore applications.

What is claimed is:
1. A threaded joint for connecting tubes used in the hydrocarbon industry, the threaded joint having a longitudinal axis extending in a proximal direction and in a distal direction opposite to the proximal direction, the threaded joint comprising:
 a threaded pin;
 a threaded box comprising an abutment surface, the pin made up in the box;
 a sealing ring comprising:
  a first base comprising a radially inner portion having a first distally extending protrusion,
  a second face axially opposite to the first base and defining two or more annular lips thereon, the two or more annular lips comprising a first lip and a second lip, the first and second lips intersecting at a valley having a bottom,
  wherein the first base is distal to the second face and distal to an end of the threaded box,
  an external cylindrical surface with at least two annular ribs,
  an internal surface opposite the external cylindrical surface,
  a groove in the first base that is radially aligned with the valley of the second face such that a line that is parallel with the longitudinal axis of the joint can be drawn through the groove and the bottom of the valley, and
 a reinforcement ring that is partially embedded in the sealing ring such that an embedded portion of the reinforce- ment ring is inside the sealing ring and a protruding portion of the reinforcement ring is outside the sealing ring;

the reinforcement ring being metal and T-shaped;

the reinforcement ring spacing apart the abutment surface and a body of the sealing ring such that the abutment surface and the body do not contact each other in operation of the joint;

the reinforcement ring directly contacting the bottom of the groove; and the reinforcement ring having a cross-section, along an axial plane, that comprises only rectangular shapes;

wherein:

the sealing ring protrudes radially beyond a radially innermost surface of the protruding portion of the reinforcement ring and a radially outermost surface of the protruding portion of the reinforcement ring, a distalmost portion of the reinforcement ring is distal of a distalmost portion of the first base of the sealing ring, the first distally extending protrusion of the first base of the sealing ring has a distal end that is distal of at least some of the radially innermost surface of the protruding portion of the reinforcement ring, the reinforcement ring is not axially located between the annular lips, the sealing ring is radially compressed between the pin and the box on a non-threaded surface of the pin, the sealing ring is in sealing contact with the box via the at least two annular ribs and is in sealing contact with the pin via the internal surface, and the pin does not include a radially protruding rib engaged with the sealing ring.

2. A threaded joint according to claim 1, wherein the internal surface of the sealing ring comprises a generally uniform diameter along the longitudinal axis of the sealing ring.

3. A threaded joint according to claim 1, wherein the internal surface is cylindrical.

4. A threaded joint according to claim 1, wherein the internal surface is rounded.

5. A threaded joint according to claim 1, wherein, when the sealing ring is in an uncompressed state, the internal surface is frustoconical with taper of about 3°.

6. A threaded joint according to claim 1, wherein the internal surface of the sealing ring comprises one or more annular ribs.

7. A threaded joint according to claim 1, wherein the sealing ring comprises an elastomeric material.

8. A threaded joint according to claim 1, wherein the first base is substantially flat.

9. A threaded joint according to claim 1, wherein the internal surface of the sealing ring contacts a tapered surface of the pin that tapers toward a nose of the pin, wherein the tapered surface is positioned on the opposite side of the threads from the nose.

10. A threaded joint according to claim 1, wherein the internal surface of the sealing ring contacts a surface of the pin that is parallel to the longitudinal axis of the joint.

11. A threaded joint according to claim 1, wherein the box has an annular groove configured to receive an external portion of the sealing ring after the joint is made up so that the at least two annular ribs of the external cylindrical surface of the sealing ring contact a surface of the groove.

12. A threaded joint according to claim 1, wherein the reinforcement ring has a square cross-section.

13. A threaded joint according to claim 1, wherein the maximum radial thickness of the reinforcement ring is less than the maximum radial thickness of the sealing ring when the sealing ring is compressed between the box and the pin.

14. A threaded joint according to claim 1, wherein a portion of the pin is coated to facilitate slidability of the sealing ring thereupon.

15. The threaded joint according to claim 1, wherein a first portion of the reinforcement ring is positioned inside the groove and a second portion is positioned outside the groove.

16. The threaded joint according to claim 1, wherein, during coupling of the pin and the box, the sealing ring slides longitudinally along and relative to the pin from a first position on the pin to a second position on the pin, wherein the entire longitudinal length of the pin between the first and second positions has a shape that is cylindrical or frustoconical.

17. The threaded joint according to claim 1, wherein the two or more annular lips comprise a first annular lip and a second annular lip, the first lip extending in a first skewed direction relative to the longitudinal axis of the joint and the second lip extending in a second skewed direction relative to the longitudinal axis, the first lip having an inner surface that is generally radially-inwardly facing and the second lip having an outer surface that is generally radially-outwardly facing, wherein:

when the sealing ring is uncompressed, the first annular lip extends radially outward of the external cylindrical surface of the sealing ring and the second annular lip extends radially inward of the internal surface of the sealing ring; and when the sealing ring is compressed between the pin and the box, the inner surface of the first annular lip and the outer surface of the second annular lip are each configured to move toward each other.

18. The threaded joint according to claim 1, wherein the pin and box define an inside duct and an outside, the joint configured to allow a flow of a hydrocarbon through the inside duct and to be in contact with sea water on the outside.

19. The threaded joint according to claim 1, wherein the annular lips define therebetween at least one substantially V-shaped channel, and the reinforcement ring is not positioned in the channel.

20. The threaded joint according to claim 1, wherein the reinforcement ring is located closer to the first base than the second face.

21. The threaded joint according to claim 15, wherein the radial thickness of the second portion is greater than the radial thickness of the first portion.

22. The threaded joint according to claim 1, wherein the first base of the sealing ring further comprises a radially outer portion having a second distally extending protrusion, the second distally extending protrusion having a distal end that is distal to at least some of a radially outermost portion of the reinforcement ring.

23. A joint comprising:

a threaded pin;

a threaded box coupled to the threaded pin;

a seal ring compressed between the box and the pin, the seal ring comprising:

a first axial end configured to contact an abutment on an inner surface of the box, the first axial end being generally planar and extending substantially the entire radial thickness of the seal ring when the seal ring is in an uncompressed state, a plurality of axially-protruding lips extending from a second axial end opposite the first axial end, an external radial surface with a plurality of radially-protruding ribs configured to sealingly contact an inner surface of the box, and an internal radial surface opposite the external surface, the internal radial surface configured to contact an outer surface of the pin; and a reinforcement ring fully embedded in the seal ring, the reinforcement ring being positioned at the radial middle of the radial thickness of the cross-section of the seal ring and closer to the first axial end than the second axial end, the radial thickness of the seal ring being between the external radial surface of the seal ring and the internal radial surface of the seal ring;

wherein, when the threaded box is fully coupled with the threaded pin:

the entire surface of the box that is in contact with the external radial surface of the seal ring is cylindrical;

the entire surface of the pin that is in contact with the internal radial surface the seal ring is frustoconical with a generally constant angle, relative to a longitudinal axis of the joint, that is greater than 1 degree; and the seal ring further comprises a projection that projects axially beyond the abutment on the inner surface of the box.

24. The joint according to claim 23, the pin further comprising a coating configured to facilitate the slideability of the seal ring.

25. The joint according to claim 23, wherein the angle of the frustoconical portion of the pin, relative to the longitudinal axis of the joint, is less than 15°.

26. The joint according to claim 23, wherein the pin comprises a frustoconical portion and a cylindrical portion, and wherein the internal surface of the seal ring contacts both portions in the course of make up.

27. The joint according to claim 23, wherein the reinforcement ring exerts a compressive force on the internal surface of the seal ring.

28. The joint according to claim 23, wherein the reinforcement ring comprises a material selected from the group consisting of aluminum, copper, nickel, silver, and stainless steel.

29. The threaded joint according to claim 23, wherein the pin does not include a radially protruding rib configured to engage the seal ring.

30. The joint according to claim 23, wherein the pin and box define an inside duct and an outside, the joint configured to allow a flow of a hydrocarbon through the inside duct and to be in contact with sea water on the outside.

31. The joint according to claim 23, wherein:

the plurality of axially-protruding lips includes a first lip and a second lip;

in an uncompressed state, the first lip and second lip of the seal ring are at first and second skewed angles relative to the longitudinal axis of the joint, and the first and second skewed angles being different; and the internal radial surface of the seal ring is at an angle relative to the longitudinal axis, the angle of the internal radial surface being less than the second skewed angled of the second lip.

32. The joint according to claim 23, wherein the seal ring is configured to be installed on the pin before the pin is coupled with the box.

33. The joint according to claim 23, wherein the projection is located on a radially innermost portion of the first axial end and protrudes axially relative to a radially middle portion of the first axial end.

34. The joint according to claim 33, wherein, when the seal ring is compressed between the pin and the box, a radially outermost portion of the first axial end substantially does not protrude axially relative to the radially middle portion of the first axial end.

35. The joint according to claim 23, wherein the first axial end is the distalmost end of the seal ring.

36. The joint according to claim 23, wherein, when the threaded box is fully coupled with the threaded pin, the seal ring is not engaged with a radially protruding rib.

* * * * *

UNITED STATES PATENT AND TRADEMARK OFFICE
CERTIFICATE OF CORRECTION

| | | |
|---|---|---|
| PATENT NO. | : 9,234,612 B2 | Page 1 of 1 |
| APPLICATION NO. | : 12/665921 | |
| DATED | : January 12, 2016 | |
| INVENTOR(S) | : Santi et al. | |

It is certified that error appears in the above-identified patent and that said Letters Patent is hereby corrected as shown below:

On the title page

Column 2 page 3, item 56 line 14, change "inclduing" to --including--.

Column 2 page 3, item 56 line 33, change "Amendements" to --Amendments--.

Column 2 page 3, item 56 line 37, change "relevent" to --relevant--.

In the specification

Column 4 line 52, Change "the a" to --a--.

Column 4 line 52, Change "of on" to --on--.

Signed and Sealed this
Second Day of August, 2016

Michelle K. Lee
*Director of the United States Patent and Trademark Office*